United States Patent Office 3,528,742
Patented Sept. 15, 1970

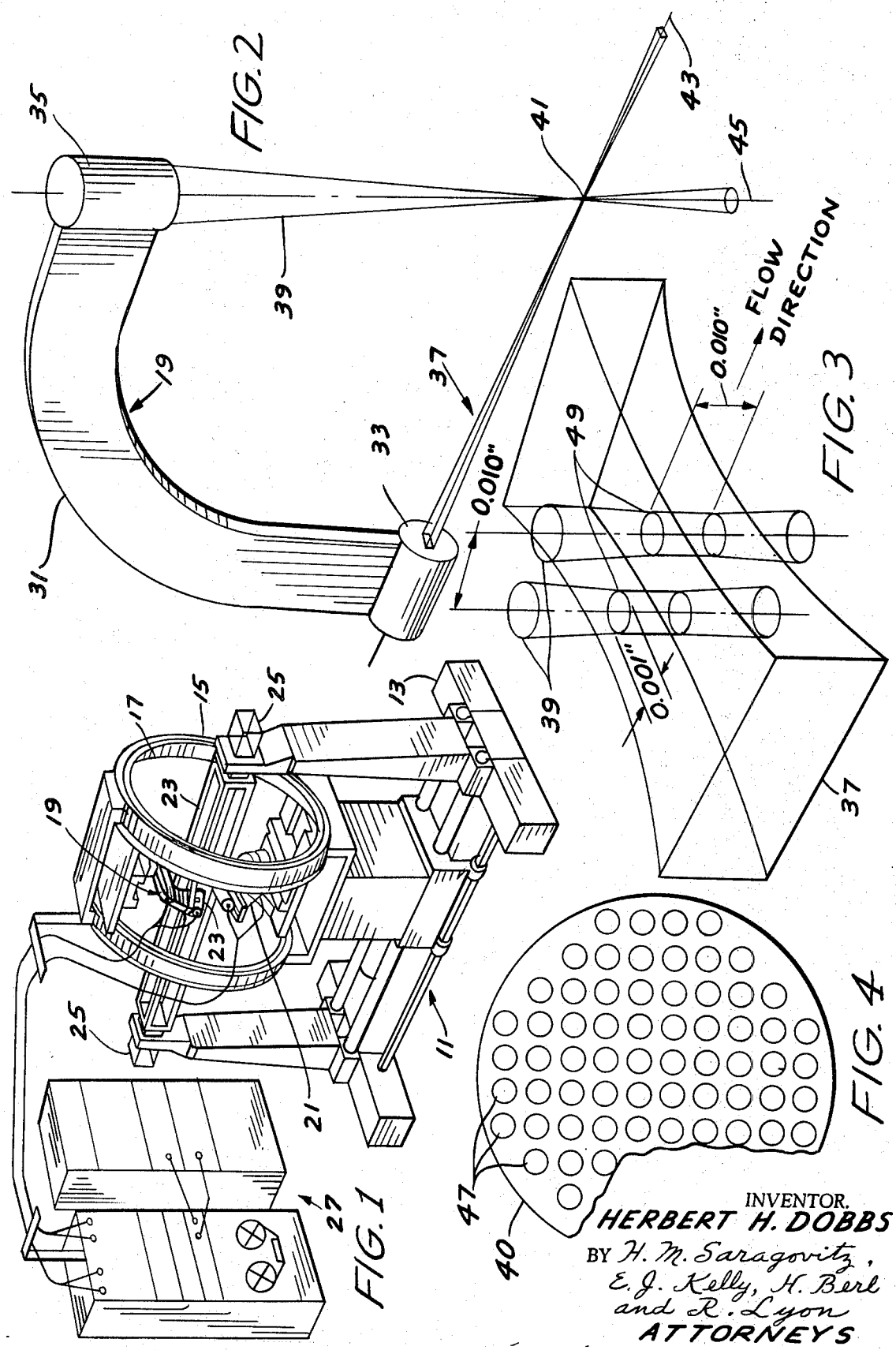

3,528,742
OPTICAL ANEMOMETER
Herbert H. Dobbs, 28490 Mound Road, Apt. 27–B,
Warren, Mich. 48092
Continuation of application Ser. No. 520,841, Jan. 13,
1966. This application July 23, 1969, Ser. No. 847,794
Int. Cl. G01n 21/00
U.S. Cl. 356—103                                    1 Claim

ABSTRACT OF THE DISCLOSURE

Method and apparatus of measuring concentration of particulate matter at a point in a moving fluid and, secondarily velocity components of the particles.

---

This application is a continuation of application Ser. No. 520,841, filed Jan. 13, 1966, now abandoned.

This invention is subject to the reservation to the Government of a non-exclusive, irrevocable royalty-free license in the invention, with power to grant sublicenses for all governmental purposes.

During the past several years, many basic research programs have been carried on in the field of fluid dynamics and, in particular, of gas flows containing fine particles. Turbulent diffusion of such particles and their deposition on surfaces bounding the flow have been of particular interest.

In order to study these phenomena more effectively, the subject of this invention, the optical anemometer, has been developed which departs radically from previous experimental techniques. This device uses the fine (micron size) particles in the flow as tracers and makes its measurements in the fluid stream without placing physical objects such as pitot tubes or thermocouples in the stream, thereby leaving the flow undisturbed.

In the prior art, hot-wire anemometers with special circuitry have been used to determine point concentrations of liquid particles in an air flow but since the method depends upon evaporative cooling of the probe filament by the particle, it is limited to liquid particulates and has a relatively low maximum counting rate. The hot-wire anemometer has also been used for measurement of velocity and velocity variations in turbulent flows but the presence of the probe in the fluid introduces errors. If the probe is relatively small with respect to the size of the stream and the measurement is being made far from any boundary, the errors do not create a servere problem. Close to the surfaces in the flow however, where most of the more useful and interesting problems in fluid dynamics occur, accurate measurement with probes is exceedingly difficult.

In another method, "isokinetic sampling," with subsequent analysis of the sample by some method of counting has been employed. This method either introduces a considerable degree of uncertainty into the measurement by the handling of the sample after it is obtained, or else, in the case of microscopic counts, Coulter Counter analysis, etc., involves a time delay as great as several hours before the results of the measurement are known.

Various methods of sample analysis, particularly the light scattering photometer as embodied in the Royco instruments, are used extensively to measure the general particle concentration levels in fluids. Due to the disturbance of the flow and the necessary size of the probe to draw off a reasonable sample, even an "isokinetic" sample is only a measure of particle concentration approximately at a point. Such an approach, in effect, averages the concentration over too long a time and too large a volume to measure anything concerning the fine structure of the flow. In practice, "isokinetc sampling" is not even possible in turbulent flows since the flow itself is unsteady in a random manner.

Photographic methods with subsequent counting of particles photographed and measurement of their trajectories have been used but they are very slow and tedious.

It is a purpose of this invention to obviate the shortcomings of the known methods of performing basic research in the field of fluid dynamics of gas flows.

It is a further purpose of this invention to provide a method and apparatus to measure:

(1) Mean concentration of particulate matter at a point in a moving fluid;

(2) Variations from the mean concentration of particulate matter at a point in a moving fluid;

(3) Mean velocity components of the flow;

(4) Variations in the mean velocity components of the flow; and (5) Various correlations between concentration variations and the variations in the mean velocity components.

It is another object of this invention to provide an optical anemometer utilizing only light beams and optical fields of view. The volume of the stream examined at one time is extremely minute and can effectively be described as a point. The data taken is stored directly on magnetic tape in digital form and can be processed directly by digital computers without manual transcription.

It is a further object of this invention to provide a method and apparatus for examining the microstructure of fluid flow with a precision and ease never before possible.

It is another object to provide a method and apparatus to use the scattered light principle to count individual prticles in an open stream rather than in a test cell.

In order to provide an understanding of the principles of the invention, a preferred embodiment shown in the accompanying drawings will be described below. It is understood, however, that no limitation of the scope of the invention is intended thereby since the invention is capable of other embodiments and of being carried out in various alternate ways which will be obvious to one skilled in the art.

In the drawing:

FIG. 1 shows a perspective illustration of the preferred embodiment of the instrumentation for measuring particle concentration and velocity.

FIG. 2 shows a sensor system for use with the embodiment of FIG. 1.

FIG. 3 is an illustrative showing of a light beam focus using two observed points or fields of view.

FIG. 4 illustrates a field of view as seen by the detector system in a single field of view, multi-point system.

As shown in FIG. 1, a traversing system 11 comprises a track bed 13 upon which is mounted a movable base which, in turn, carries a set of circular tracks 15. Tracks 15 carry a rotatable cage 17 to which is attached an upper sensor system 19 and a lower sensor system 21. The sensor systems are adjustably carried on cage 17 by means of suitable bases fixed to the rotatable cage. The sensors are thus mounted in such a manner as to be adjustable in three dimensions relative to the track bed and to each other.

Extending parallel to the length of the track bed and coaxially with the rotatable cage is a clear glass duct 23 through which the flow to be studied is passed. The duct 23 is connected to fluid entrance and exhaust ducts (not shown) at connectors 25, 25.

The sensor systems 19 and 21 are suitably electrically connected to a signal processing electronic system 27 having a digital magnetic tape recorder. The details of this system do not constitute a part of this invention in themselves and they shall therefore not be described here.

FIG. 2 shows a more detailed illustration of the sensor system 19. Since sensor system 21 is identical to 19, only unit 19 will be described here.

An illuminating system consisting of a light source and suitable lens system 33 is mounted on rigid frame 31 with a detector system 35, consisting of a photo sensor and suitable lens system, in such a manner that the detector system "observes" the focal point 41 of the light beam 37 from the illuminating system at approximately 90° to the light beam axis 43.

Any suitable illuminating and detector systems may be used. Examples of such systems are the Sylvania A25 Zirconium Arc Lamp and the Bendix Corp. Channeltron, respectively.

With sensor systems 19 and 21 carried by apparatus such as shown in FIG. 1, different points in the flow can be observed and the distance between them can be accurately determined.

The detector system 35 may be constructed to observe either a single point or two closely spaced points in the focus 41 of the light beam 37. The direction of flow will usually be normal to the plane defined by the axis 43 of the light beam and the axis of view 45 of the detector system. It may, however, be at a lesser angle to the plane so defined if the experimental situation and the adjustments built into the sensor system permit it.

The detector system 35 may be constructed to observe two points, the intersections of the two fields of view 39 with the light beam 37 as shown in FIG. 3, which may be shaped by optical stops. Thus are defined two sensitive volumes of space 49. One such volume is downstream of the other on a line parallel to the flow. The dimensions shown in FIG. 3 of the size and spacing of these volumes are merely typical and can be varied as appropriate.

In operation, the fluid flow must be selected with small solid or liquid particles as tracers. These particles may be natural particles in the fluid stream or may be injected into it. The particle size may be varied according to the experimental situation but should be no longer than one-third the size of the smallest dimension of one of the sensitive volumes. When a particle being carried by the flow enters one of these volumes, according to the Mie theory it will scatter light in all directions. The light scattered into the field of view of that volume will be observed and the detector system 35 will sense the presence of the particle. This is the same basic scientific principle employed in the photometer.

If the two sensitive volumes 39 shown in FIG. 3 are aligned in the flow direction so that one follows the other going downstream, a significant percentage of particles which pass through the first sensitive volume will also pass through the second sensitive volume. Since the spacing of the two volumes is known, the particles can be timed over that distance and their velocities in the direction of flow can be determined. In a period of observation, which may be as short as 0.001 second, all particles entering one of the two sensitive volumes are counted, and all which pass through both sensitive volumes are timed. The average velocity of all of the timed particles may be taken as the flow velocity, and this, when multiplied by the period of observation and the known cross sectional area of the sensitive volumes normal to the flow, gives a volume of fluid which has been observed during the period of observation and in which all particles have been counted. The particle concentration in that volume is obviously the number of particles counted during the period of observation divided by the volume of fluid observed. With typical sensitive volume dimensions, as shown in FIG. 3, and with short periods of observation, this is a very small volume and the concentration so determined is essentially a point concentration.

Since the individual velocities and particle counts will ordinarily follow each other far too rapidly and in far too large numbers for any direct print-out or manual recording, several data handling techniques appear applicable. The preferred technique is to record each individual velocity and particle count directly onto magnetic tape in a format suitable for direct processing by a digital computer. In this way, the data can be used to compute any presently desired quantity and later re-used to extract information which new theories indicate is present in it.

The two points of observation, or dual field of view approach described above and shown in FIG. 3 is limited to measuring the velocity only in the main flow direction. This limitation can be overcome, if desired, by a single field of view approach where the actual path of the particle through the field of view is traced. This can be done by fashioning the optical devices of detector system 35 so as to provide a higher powered magnification thereby spreading the view over a larger area 40. Such an area is shown in FIG. 4. In theory, area 40 might consist of an infinite number of sensitive spots 47 for detecting particles. The spots are each created by a single photomultiplier device behind the lens of the sensor system. In actuality, the number of spots is severely limited by inherent electronic deficiencies. The diameter of field 40 should be on the order of twenty-five or more times the particle diameter and should be at least ten times the diameter of the sensitive spots. If, as shown in FIG. 4, the field of view 40 consists of many sensitive points, as the particle passes each point, its position and time are recorded. If, on the other hand, the sensor system merely senses the points where the particle enters and leaves the field and the time of transit, the path of the particle across the field is assumed to be a straight line, and the data processing function is identical.

The discussion thus far has been of a single sensor system. While for much work this is sufficient, for many applications the optical anemometer would be constructed with two identical sensor systems able to move independently so that both could observe the same point in space or two separate points a known distance apart.

Thus, it is evident that the applicant has presented a new and novel device which represents a great advance in scientific laboratory equipment. The optical anemometer is susceptible to various changes and modifications within the spirit of the invention including dimensioning and equivalents and other obvious expedients. Thus, the above description should be considered to be merely illustrative and not to limit the scope of the following claim.

I claim:
1. Apparatus for measuring and recording concentration and velocity components and their correlations of particulate matter at one or more points in a moving fluid, comprising,
   a track bed,
   opposed upright standard members supported by said track bed,
   a movable base mounted on said track bed,
   a pair of circular opposed tracks carried by said movable base member, having a movable cage member mounted therebetween,
   a duct member interposed between and supported by said opposed upright standard members:
      passing through and being surrounded by each of said opposed circular tracks, said duct having connector members secured to each end thereof to deliver fluid to be studied to said duct member, two sensor frames independently and adjustably supported upon said cage member, each having first a light detector mounted thereon, and second an illuminating member mounted on the opposite end of said sensor frame to provide a shaped light beam at the focus of said light detector, whereby, two sensor systems are thus formed, each consisting of a detector and an illuminator mounted on said sensor frame and each adapted to move individually within said supporting cage member, whereby, each system can thus be positioned to simultaneously make measurements at two different points in the flow being studied, or whereby, both systems may simultaneously make measurements at the same point in the flow being studied, an electronic data processing section connected to receive data from said two sensor systems and for analyzing said data, a digital magnetic tape recorder, and;

electrical conduit means connecting said electronic data processing section to said digital magnetic tape recorder.

References Cited

UNITED STATES PATENTS

| | | |
|---|---|---|
| 2,487,865 | 11/1949 | Glassey. |
| 2,920,525 | 1/1960 | Appel et al. |
| 3,199,346 | 8/1965 | Stewart. |
| 2,920,525 | 1/1960 | Appel et al. _____ 356—103 X |
| 2,807,416 | 9/1957 | Parker et al. _____ 235—92 |
| 2,967,450 | 1/1961 | Shields et al. |
| 3,142,984 | 8/1964 | Harmon et al. |
| 3,199,346 | 8/1965 | Stewart _____ 250—218 X |
| 3,303,699 | 2/1967 | Scott. |

RONALD L. WILBERT, Primary Examiner

T. MAJOR, Assistant Examiner